United States Patent [19]

Bricheno

[11] Patent Number: 4,801,185
[45] Date of Patent: Jan. 31, 1989

[54] DIRECTIONAL COUPLER
[75] Inventor: Terry Bricheno, Exxex, Great Britain
[73] Assignee: STC PLC, London, England
[21] Appl. No.: 32,783
[22] Filed: Mar. 31, 1987
[30] Foreign Application Priority Data
May 23, 1986 [GB] United Kingdom ............... 8612660
[51] Int. Cl.$^4$ .......................... G02B 6/02; G02B 6/26
[52] U.S. Cl. ............................... 350/96.15; 350/96.29
[58] Field of Search ............... 350/96.15, 96.16, 96.29

[56] References Cited

U.S. PATENT DOCUMENTS

| | | | |
|---|---|---|---|
| 4,330,170 | 5/1982 | Johnson | 350/96.16 |
| 4,457,581 | 7/1984 | Johnson et al. | 350/96.16 |
| 4,591,372 | 5/1986 | Bricheno et al. | 350/96.15 |
| 4,632,513 | 12/1986 | Stowe et al. | 350/96.15 |

FOREIGN PATENT DOCUMENTS

| | | |
|---|---|---|
| 0148569A | 7/1985 | European Pat. Off. . |
| 0191235A | 8/1986 | European Pat. Off. . |
| 0174014A | 12/1986 | European Pat. Off. . |
| 2150703 | 7/1985 | United Kingdom . |

OTHER PUBLICATIONS

B. S. Kawasaki et al, "Low-Loss Access Coupler for Multimode Optical Fiber Distribution Networks", Applied Optics, vol. 16, No. 7, 1977.
B. S. Kawasaki et al, "Biconical-Taper Single-Mode Fiber Coupler", Optics Letters, vol. 6, No. 7, Jul. 1981.
Electronics Letters, vol. 21, No. 6, Mar. 1985, pp. 249-251, M. S. Yataki et al., "All-Fibre Polarizing Beamsplitter".
IEE Proceedings vol. 132, part J, No. 5, Oct. 1985, pp. 297-302, G Georgiou et al., "Low-Loss Single-Mode Optical Couplers".
Electronics Letters vol. 19, No. 16, 4th Aug. 1983, p. 601, R. B. Dyott et al., "Polarisation-Holding Directional Couplers Made From Elliptically Cored Fibre Having a D Section".

Primary Examiner—William L. Sikes
Assistant Examiner—Akm E. Ullah
Attorney, Agent, or Firm—Lee & Smith

[57] ABSTRACT

A fused tapered optical fibre directional coupler for use in a polarisation-preserving fibre system has a short stub length of non-polarisation-preserving fibre spliced into each fibre from which the coupler is made. The reduced diameter and tapered portions of the coupler are confined to the stub lengths since it is found that low loss coupling is not achieved if these portions are fabricated in fibre with a polarisation-preserving structure.

2 Claims, 1 Drawing Sheet

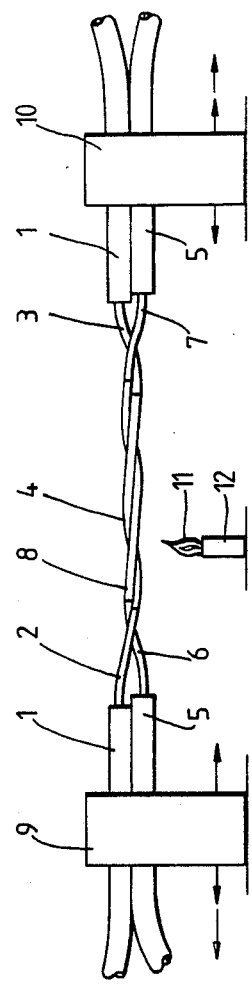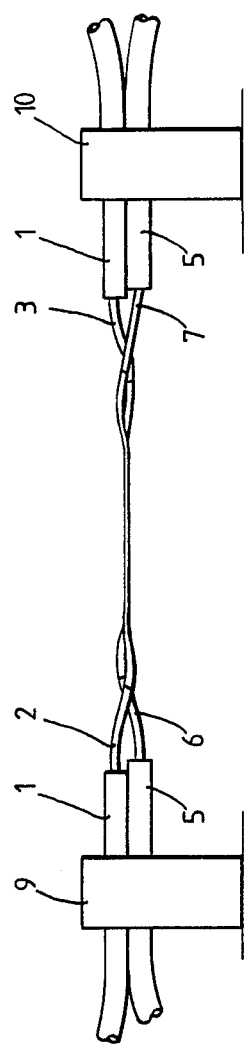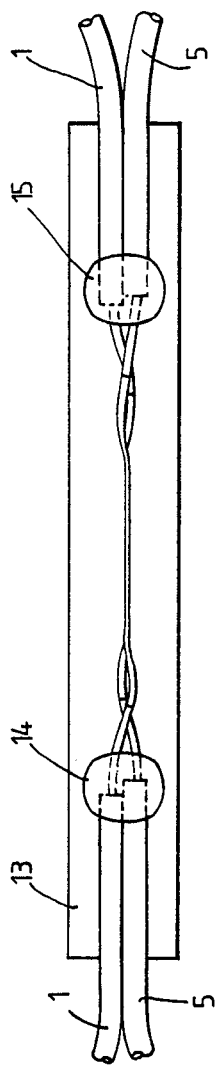
Fig.1.
Fig.2.
Fig.3.

DIRECTIONAL COUPLER

BACKGROUND OF THE INVENTION

So-called single mode optical fibre that is circularly symmetric is in fact capable of supporting two degenerate orthogonally polarised modes. Bends, twists and other irregularities are liable to introduce coupling between these modes, with the result that the polarisation state with which light is launched into one end of such fibre is soon changed as the light propagates along the fibre. In many coherent light optical fibre communications systems and sensor systems the resulting indeterminate change of state of polarisation (SoP) is unacceptable in which case use is made of fibre in which the degeneracy of the two zero-order modes is removed. The two modes are arranged to have sufficiently different propagation constants for the bends, twists and other irregularities encountered by the fibre to introduce substantially no coupling of the modes, and hence the separate identity of the two modes is preserved as light propagates down such fibre. Mode degeneracy is removed by making the fibre deliberately birefringent.

For the purposes of this specification single mode optical fibre which is designed to be sufficiently birefringent to inhibit coupling between its zero-order modes will be referred to as polarisation-preserving fibre, also known as high-birefringence fibre. Single mode fibre which has not been designed to be birefringent, and which therefore either exhibits no birefringence, or for which residual birefringence is too small to be effective in the prevention of mode coupling, will be referred to as non-polarisation-preserving single mode fibre.

Many of the systems that require the use of polarisation maintaining fibre in order to avoid the generation of indeterminate changes of SoP also require the use of branching and/or tapping elements in their optical fibre networks. Such elements are conveniently implemented in optical fibre as optical fibre directional couplers. In ordinary, non-polarisation maintaining fibre low insertion loss examples of such elements are advantageously provided by optical fibre directional couplers created by the method described in United Kingdom Patent Specification No. 2150703A (U.S. Pat. No. 4,591,372). Satisfactory results have however not been obtained when attempting to make such directional couplers of high stress-induced birefringence polarisation-preserving fibre.

SUMMARY OF THE INVENTION

The present invention is concerned with the provision of adequately low loss single mode fibre directional couplers for use in polarisation-preserving fibre networks.

According to the present invention there is provided a fused tapered optical fibre directional coupler, which coupler is constructed from a plurality of lengths of single mode fibre that have been arranged in side by side assembly and drawn down and fused together to produce a reduced diameter portion of the assembly within which reduced diameter portion the fibres are mutually coupled, wherein each one of said plurality of lengths of single mode fibre is formed of two axes-aligned portions of polarisation-preserving fibre spliced to opposite ends of an associated stub of non-polarisation-preserving fibre, and wherein said stubs accommodate the reduced diameter portion of the assembly within which the fibres are mutually coupled.

The problem associated with trying to fabricate directional couplers directly in high stress-induced birefringence fibre results from the unfavourable refractive index profile that is associated with the provision of the required stress pattern. The usual technique for inducing stress-birefringence into a fibre structure involves the provision of heavily doped regions of the cladding in regions adjacent the optical core. These heavily doped regions having a significantly different thermal expansion from the rest of the fibre, and the stress results from the effects of differential thermal expansion when the fibre is cooled to room temperature from the high temperature at which it was drawn from fibre preform. Associated with the heavy doping to induce the intended differential thermal expansion effect produced by the differential doping, is an unintended differential refractive index effect. When such a fibre is tapered down in size in an attempt to make a directional coupler, too much light is coupled into unwanted modes associated with the stress-inducing structure instead of into the zero-order core modes of the other fibre or fibres of the directional coupler. The consequence is that the resulting coupler does not function properly, but exhibits an unacceptably high insertion loss.

According to the teachings of the present invention this problem is circumvented by substituting non-polarisation-preserving fibre for the polarisation preserving fibre over the region where mutual coupling of the fibres is arranged to occur. Although the inserted non-polarisation-preserving fibre contains no structure to ensure that the SoP of light launched into one end propagates to the other end with substantially no change of SoP, nevertheless such a preservation of SoP is found in practice to occur. This is because the distance is relatively short, and over this distance the fibre is restrained against the sorts of bends, twists and irregularities that would otherwise be liable to induce significant changes of SoP.

BRIEF DESCRIPTION OF THE DRAWINGS

There follows a description of the manufacture of a directional coupler embodying the present invention in a preferred form. The description refers to the accompanying drawings in which:

FIGS. 1 to 3 depict successive stages in the manufacture of the directional coupler.

DETAILED DESCRIPTION OF THE PREFERRED EMBODIMENT

A length of polarisation-preserving single mode optical fibre complete with plastics protective coating 1 is cleaved into two pieces 2, 3 to enable a stub length 4 of non-polarisation-preserving single mode fibre to be inserted in between the cleaved ends. Conveniently this insertion is effected by first forming a fusion splice between one of the pieces of polarisation-preserving fibre and a piece of non-polarisation-preserving fibre (not shown), and then re-cleaving the fibre a short distance along the non-polarisation-preserving fibre from the splice, before connecting the second piece of polarisation-preserving fibre by means of a second fusion splice. In making the second fusion splice, care needs to be taken that the axes of the two pieces of polarisation-preserving fibre are aligned with each other.

A second length of identical polarisation preserving fibre complete with plastics protective coating 5 is similarly divided into two pieces 6, 7 for the insertion of its stub length 8 of non-polarisation-preserving fibre.

The two lengths of fibre are then assembled for making a directional coupler. For this purpose the fibres need to be in glass-to-glass contact with each other along the region that is to be drawn down to provide the mutual optical coupling. This region of contact is conveniently provided by stranding the fibres, as illustrated in FIG. 1, while taking care that the stranding introduces substantially no twist of either fibre about its own axis. Preferably the stranded fibres are clamped between independently driven carriages 9 and 10 for the making of the fused directional coupler by the progressive stretching method substantially as described in United Kingdom Patent Specification No. 2150703A now (U.S. Pat. No. 4,591,372).

According to this method the fibres are heated in a flame 11 of a burner 12 to produce local softening of the glass while the fibres are being moved in a longitudinal direction through the flame. To this end the leading carriage, carriage 9 for a rightward traverse, carriage 10 for a leftward traverse, is traversed at a slightly faster rate than the trailing carriage. This stretching process is repeated a number of times until the requisite amount of coupling has been produced. Typically, though not essentially, successive traverses are performed in opposite directions. The extent of the traverses are limited so that the stretching is confined exclusively to the stub lengths 4 and 8 of non-polarisation-preserving fibre. In a typical example these stub lengths are initially about 5 to 6 mm long, and the central 1mm is stretched to about 5mm.

When the desired coupling has been reached the fibres are mounted upon a substrate. Conveniently this may take the form of a rod 13 (FIG. 3), made for instance of fused silica, to which the fibres are secured by the application of quantities of adhesive resin applied at locations 14 and 15 where the fibres emerge from their plastics protective coatings. In this way the portion of the fibres between the two resin attachment points 14 and 15 is held in a substantially strain-free fashion. This ensures that polarisation state is well retained even in regions where the light is propagating in non-polarisation-preserving fibre. This in turn means that the stub lengths 4 and 8 of fibre can, if required, be made significantly longer than is necessary solely to accommodate the stretched region.

For further mechanical protection the assembly may be placed in a long slender box (not shown) where its ends are anchored before the interior of the box is filled with a soft potting compound such as a silicone rubber. Alternatively, the shape of the substrate to which the fibres are secured may be such that it can be filled with the potting compound after attachment of the fibres to an interior surface thereof.

Although the foregoing description has related specifically to the construction of a 4-port directional coupler constructed from two fibres, it is to be clearly understood that the invention is applicable also to directional couplers with more than 4 ports, particularly 6-port couplers constructed from three fibres.

I claim:

1. A fused tapered optical fibre directional coupler, which coupler is constructed from a plurality of lengths of single mode fibre that have been arranged in side by side assembly and drawn down and fused together to produce a reduced diameter portion of the assembly within which reduced diameter portion the fibres are mutually coupled, wherein each one of said plurality of lengths of single mode fibre is formed of two axes-aligned portions of polarisation-preserving fibre spliced to opposite ends of an associated stub of non-polarisation-preserving fibre, and wherein said stubs accommodate the reduced diameter portion of the assembly within which the fibres are mutually coupled.

2. A directional coupler as claimed in claim 1 which coupler is constructed from two lengths of single mode fibre each incorporating its stub of non-polarisation-preserving fibre spliced between two axes-aligned portions of polarisation-preserving fibre.

* * * * *